(12) United States Patent
Zhang et al.

(10) Patent No.: US 12,522,201 B2
(45) Date of Patent: Jan. 13, 2026

(54) TURBO LAG BOOST COMPENSATION METHOD, APPARATUS, AND DEVICE

(71) Applicant: GREAT WALL MOTOR COMPANY LIMITED, Hebei (CN)

(72) Inventors: Jie Zhang, Hebei (CN); Hailan Wang, Hebei (CN); Lei Zhang, Hebei (CN); Xiao Wang, Hebei (CN); Haijun Song, Hebei (CN); Yan Sun, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 800 days.

(21) Appl. No.: 17/790,232

(22) PCT Filed: Jan. 14, 2021

(86) PCT No.: PCT/CN2021/071760
§ 371 (c)(1),
(2) Date: Jun. 30, 2022

(87) PCT Pub. No.: WO2021/143769
PCT Pub. Date: Jul. 22, 2021

(65) Prior Publication Data
US 2023/0043607 A1 Feb. 9, 2023

(30) Foreign Application Priority Data
Jan. 14, 2020 (CN) .......................... 202010038418.7

(51) Int. Cl.
*B60W 20/40* (2016.01)
*B60W 10/02* (2006.01)
*B60W 10/08* (2006.01)

(52) U.S. Cl.
CPC ............ *B60W 20/40* (2013.01); *B60W 10/02* (2013.01); *B60W 10/08* (2013.01)

(58) Field of Classification Search
CPC ...... B60W 10/02; B60W 10/06; B60W 10/08; B60W 20/19; B60W 20/40;
(Continued)

(56) References Cited

U.S. PATENT DOCUMENTS 9,708,988 B2 * 7/2017 Shimizu ................. F02D 33/02
10,161,319 B2  12/2018 Naidu et al.
(Continued)

FOREIGN PATENT DOCUMENTS

BR  102014009467 A2 * 1/2015 ............ F02D 11/105
CN      102958728 A     3/2013
(Continued)

OTHER PUBLICATIONS

An English-translated version of Toyota Motor Corp., JP 2015150974A (published Aug. 24, 2015) (Year: 2015).*
(Continued)

*Primary Examiner* — Cuong H Nguyen
(74) *Attorney, Agent, or Firm* — Schmeiser, Olsen & Watts LLP

(57) ABSTRACT

A turbo lag boost compensation method is provided, including: calculate a theoretically required boost torque Ts; compare the theoretically required boost torque Ts with the maximum output torque Tpmax of a P2 motor; when Ts≥Tpmax, a required output boost torque Ts' is equal to Tpmax; when Ts<Tpmax, the required output boost torque Ts' is equal to Ts; determine whether a turbo lag boost timing is activated; if yes, output the required output boost torque Ts'; and if not, the boost torque is zero. Also provided are a turbo lag boost compensation apparatus, a turbo lag boost compensation device, a hybrid power vehicle, and a storage medium. The present invention effectively solves adverse effects such as a slow torque response and a sudden torque (Continued)

change caused by a turbo lag on an entire vehicle, and improves the drivability and power of the entire vehicle.

17 Claims, 8 Drawing Sheets

(58) Field of Classification Search
CPC ............ B60W 2510/0657; B60K 6/48; B60K 2006/4825; Y02T 10/12; Y02T 10/62; F02D 41/0007
USPC ........................................................ 123/564
See application file for complete search history.

(56) References Cited

U.S. PATENT DOCUMENTS

| | | | |
|---|---|---|---|
| 11,121,650 B2* | 9/2021 | Froelich | .................. B60K 1/02 |
| 2003/0106541 A1* | 6/2003 | Dixon | ..................... F02D 23/02 |
| | | | 123/565 |
| 2009/0088944 A1 | 4/2009 | Aswani et al. | |
| 2013/0296107 A1* | 11/2013 | Nedorezov | ......... B60W 30/192 |
| | | | 903/902 |
| 2016/0023650 A1 | 1/2016 | Jiang et al. | |
| 2016/0084178 A1* | 3/2016 | Shimizu | .............. F02D 41/0007 |
| | | | 123/568.21 |
| 2018/0105047 A1* | 4/2018 | Yoo | .......................... B60K 6/48 |

FOREIGN PATENT DOCUMENTS

| | | | | | |
|---|---|---|---|---|---|
| CN | 103108789 A | * | 5/2013 | ............ | B60W 10/02 |
| CN | 103386961 A | | 11/2013 | | |
| CN | 103443417 A | | 12/2013 | | |
| CN | 103963778 A | | 8/2014 | | |
| CN | 105189234 A | | 12/2015 | | |
| CN | 107415928 A | | 12/2017 | | |
| CN | 108223230 A | | 6/2018 | | |
| CN | 108528439 A | * | 9/2018 | ............ | B60W 20/00 |
| CN | 108657169 A | | 9/2018 | | |
| CN | 109094551 A | | 12/2018 | | |
| CN | 109664871 A | | 4/2019 | | |
| DE | 102017129136 A1 | * | 6/2018 | ............ | F02N 11/04 |
| JP | 2015150974 A | | 8/2015 | | |

OTHER PUBLICATIONS

An English-translated version of Li, Hong-Fei et al (CN 108528439 A) (Year: 2018).*
Baines[1], N. C., et al. "Trends in passenger car powertrains and their impact on turbocharger developments." 14th International Conference on Turbochargers and Turbocharging. CRC Press, (Year: 2020).*
An English-translated version of DE102017129136A1 by Hyun Kim (Year:2018) (Year: 2018).*
An English-translated version of CN108528439A by Zhejiang Geely Holding Group Co Ltd et al (Year:2018) (Year: 2018).*
Baines, N. C., et al. "Trends in passenger car powertrains and their impact on turbocharger developments." 14th International Conference on Turbochargers and Turbocharging (Year:2020) (Year: 2020).*
International Search Report for PCT/CN2021/071760 issued Apr. 2, 2021.

* cited by examiner

| rotation speed / torque | 1000 | 1300 | 1500 | 2000 | 2500 | 3000 |
|---|---|---|---|---|---|---|
| -50 | 1000 | 1000 | 1000 | 1000 | 1000 | 1000 |
| 50 | 1000 | 1000 | 1000 | 1000 | 1000 | 1000 |
| 75 | 420 | 250 | 32 | 45 | 80 | 500 |
| 100 | 420 | 200 | 26 | 30 | 40 | 500 |
| 150 | 420 | 130 | 20 | 15 | 25 | 500 |
| 250 | 420 | 100 | 30 | 30 | 10 | 500 |

FIG. 9

TURBO LAG BOOST COMPENSATION METHOD, APPARATUS, AND DEVICE

CROSS-REFERENCE TO RELATED APPLICATIONS

This application claims priority to PCT Application No. PCT/CN2021/071760, having a filing date of Jan. 14, 2021, which claims priority to Chinese Application No. 202010038418.7, having a filing date of Jan. 14, 2020, the entire contents both of which are incorporated herein by reference.

FIELD OF TECHNOLOGY

The following relates to the field of turbocharged engine technologies of P2 hybrid power vehicles, and particularly relates to a turbo lag boost compensation method, apparatus and device.

BACKGROUND

A turbocharged engine is an engine provided with a turbocharger (referred to as a turbine), which can use an inertial impact force of exhaust gas discharged from the engine to drive a turbine in a turbine chamber to rotate, and the turbine in turn drives a coaxial impeller to rotate to compress and feed fresh air from a pipe of an air filter, such that the fresh air is boosted and enters into a cylinder of the engine, thereby increasing air intake volume of the cylinder and fully mixing fuels with the air to increase output power of the engine. The turbine of the turbocharged engine is a moving part provided with a certain inertia and requires high rotation speed during normal operation, and it takes a certain time period from the start of the turbine to the normal supercharging of the turbine. During this time period, the engine is equivalent to natural aspiration, at this moment, the efficiency of the engine is low, torque that the engine can provide to a whole vehicle is limited, and this time period is not in its optimal working stage, thereby the fuel consumption is poor. After the turbocharging is completed, the turbine will suddenly exert force, causing the whole vehicle to rush, thereby the drivability is poor. This effect that a delay is existed in delivered energy response due to that the turbine starts tuning after the time the turbine takes to overcome the inertia of the impeller is commonly referred to as "turbo lag".

A hybrid power vehicle refers to an oil-electric hybrid power vehicle, that is, a mixture of fuel (gasoline, diesel) and electric energy. The hybrid power vehicle is an auxiliary power driving vehicle which uses an electric motor as a turbocharged engine, and involves in an advantage complementary technology. At present, hybrid power vehicles are classifies as P0, P1, P2, P3, P4, etc. in the industry according to a placement position of an electrified component (motor). Here, the definition of P is the position of the motor. Based on original powertrain, the P2 hybrid power vehicle realizes hybrid power after the K0 clutch through adding a set of motor and two clutches between a piston engine and a transmission and placing the motor at an input end of the transmission.

In order to solve the problem caused by "turbo lag", Japanese joint-stock company MI proposed an electric auxiliary supercharger and control method thereof in Chinese Patent Application CN103443417A, in which the rotation speed of the turbocharger is increased through applying a rotational force to the turbocharger by using an electric motor, so that the boost of the engine can be increased quickly and the torque of the engine will also increase quickly. CN103443417A uses the electric motor to power the turbocharger, which can only shorten the time from initiation of the turbine to normal rotation of the turbine, but does not fundamentally solve the possibility of the turbo lag.

Another solution is to use the P2 motor to provide power compensation for the whole vehicle during the turbo lag until the turbine turns normally. This method can fundamentally avoid an adverse effect on the whole vehicle caused by insufficient power during the turbo lag. However, due to inaccurate boost providing time, the power is provided too early or too late, resulting in unexpected torque, which affects smooth operations of the whole vehicle.

Therefore, a new solution is urgently needed in this field, which can accurately grasp the timing of providing boost.

The contents in the Background section are merely technologies known to the applicant, and do not of course represent the conventional art in the field.

SUMMARY

An aspect relates to a concept that the torque is provided at a suitable time to compensate partial torque that a turbocharged engine cannot provide for an entire vehicle. One purpose of the present disclosure is to provide a turbo lag boost compensation method, and the method includes: calculating theoretical required boost torque $Ts$; determining required output boost torque $Ts'$ according to a magnitude relationship between the theoretical required boost torque $Ts$ and maximum torque $Tpmax$ enabled to be output by a P2 motor; determining whether timing for turbo lag boost is activated; outputting the determined required output boost torque $Ts'$ when the timing for the turbo lag boost is activated; and determining boost torque as zero when the timing for the turbo lag boost is not activated.

Aiming at the phenomenon of the turbo lag, the present disclosure determines the timing for boosting, and the required boost for compensation is only output when the condition is met, which effectively solves the adverse effects of the turbo lag on the entire vehicle, such as slow torque response and sudden torque change, and avoids boost providing when it is not a time to provide the boost, thereby improving the drivability and power performance of the entire vehicle.

Further, said determining required output boost torque $Ts'$ according to a magnitude relationship between the theoretical required boost torque $Ts$ and maximum torque $Tpmax$ enabled to be output by a P2 motor includes: when $Ts \geq Tpmax$, determining the required output boost torque $Ts'$ as $Ts'=Tpmax$; when $Ts<Tpmax$, determining the required output boost torque $Ts'$ as $Ts'=Ts$.

Further, the theoretical required boost torque $Ts$ is calculated according to $Ts=Td-(Ti+Tm)$; where $Td$ is instant required torque of an entire vehicle, $Ti$ is instant actual torque of a turbocharged engine, $Tm$ is instant required torque of the P2 motor.

Further, the timing for the turbo lag boost includes a theoretical boost timing and an actual boost timing, and said determining whether timing for turbo lag boost is activated includes: determining whether both the theoretical boost timing and the actual boost timing are activated.

Further, said determining whether the actual boost timing is activated includes: determining whether an entire vehicle is in a clutch start operating condition, determining not to activate the actual boost timing when it is determined that the entire vehicle is in the clutch start operating condition, and determining to activate the actual boost timing when it is determined that the entire vehicle is not in the clutch start operating condition.

Further, said determining whether the theoretical boost timing is activated includes: determining a boost interval value of a turbocharged engine under a current operating condition; comparing the required output boost torque Ts' with the boost interval value; determining to activate the theoretical boost timing when the required output boost torque Ts'>the boost interval value; determining not to activate the theoretical boost timing when the required output boost torque Ts'≤the boost interval value.

Further, said determining a boost interval value of a turbocharged engine under a current operating condition includes: according to an engine rotation speed and engine torque of the turbocharged engine under the current operating condition, looking for the corresponding boost interval value from a pre-calibrated table including a corresponding relationship between different engine rotation speeds, engine torque and boost interval values.

Further, before outputting the required output boost torque Ts', filtering is performed on the required output boost torque Ts'.

Another purpose of the present disclosure is to provide a turbo lag boost compensation apparatus, and the apparatus includes: a calculation module configured to calculate theoretical required boost torque Ts; a determination module configured to determine required output boost torque Ts' according to a magnitude relationship between the theoretical required boost torque Ts and maximum torque Tpmax enabled to be output by a P2 motor; a judgment module configured to determine whether timing for turbo lag boost is activated; an output module configured to output the determined required output boost torque Ts' when the timing for the turbo lag boost is activated.

Further, the timing for the turbo lag boost includes a theoretical boost timing and an actual boost timing, and the judgment module includes: a first judgment sub-module configured to: determine whether the required output boost torque Ts' is greater than a pre-configured boost interval value, and determine to activate the theoretical boost timing when the required output boost torque Ts' is greater than a pre-configured boost interval value; a second judgment sub-module configured to determine whether an entire vehicle is in a clutch start operating condition, and determine to activate the actual boost timing when the entire vehicle is not in the clutch start operating condition; here the timing for the turbo lag boost is activated when both the theoretical boost timing and the actual boost timing are activated.

Further, the boost interval value is pre-configured based on an engine rotation speed and engine torque of a turbocharged engine under different operating conditions.

Further, the calculation module includes: an acquisition sub-module configured to acquire required torque Td of an entire vehicle, instant actual torque Ti of a turbocharged engine, and required torque Tm of the P2 motor; a calculation sub-module configured to calculate and acquire the theoretical required boost torque Ts by adopting a formula Ts=Td−(Ti+Tm).

Further, the determination module includes: a first determination sub-module configured to determine the maximum torque Tpmax enabled to be output by the P2 motor as the required output boost torque Ts' when the theoretical required boost torque Ts is greater than or equal to the maximum torque Tpmax enabled to be output by the P2 motor; a second determination sub-module configured to determine the theoretical required boost torque Ts as the required output boost torque Ts' when the theoretical required boost torque Ts is less than the maximum torque Tpmax enabled to be output by the P2 motor.

Another purpose of the present disclosure is to provide a turbo lag boost compensation device, and the device includes: one or more processors; a storage apparatus configured to store one or more programs; here the one or more programs, when executed by the one or more processors, cause the one or more processors to implement any of the methods described above.

The present disclosure further discloses a hybrid power vehicle, which includes: a turbocharged engine; a transmission; a clutch connected between the turbocharged engine and the transmission; a P2 motor connected between the clutch and the transmission; and the turbo lag boost compensation apparatus or the turbo lag boost compensation device, configured to control the P2 motor to provide compensation boost.

The present disclosure further discloses a storage medium having a program stored thereon, the program, when executed by a processor, implements any of the methods described above.

The present disclosure determines the timing for providing the boost, and can provide the most suitable boost for the entire vehicle at the most appropriate timing. The timing for boosting is determined based on the actual conditions of the engine and the entire vehicle, so that the timing for the boosting is more in line with the actual requirements of the vehicle's operating condition.

In the processes of boost compensation calculation and boost timing determination, if the actual state and actual capability of the turbocharged engine are not introduced, the torque calculation of the boost compensation is not fully considered, which is likely to cause too much or too little boost compensation as well as inaccurate boost timing determination, and irregular torque of the entire vehicle and unexpected torque will occur without comprehensive consideration of the torque required by the driving of the entire vehicle. The present disclosure comprehensively considers the actual state as well as the actual capability and required capability of the turbocharged engine to determine the timing for boosting; and calculates the boost torque required by the turbocharging based on the actual torque of the turbocharged engine and the P2 motor as well as the torque of the front axle required by the driver, thereby the determination is accurate.

Before the boost is output, the boost will be filtered according to the boost value, to further prevent a sudden torque change of the entire vehicle and rushed acceleration of the entire vehicle due to generation of the sudden boost.

When the boost compensation is not needed, the timing for boost judgment will not be activated, the boost will drop gradiently and exit slowly, and the whole process of the turbocharging boost will end.

The boost compensation provided by the present disclosure can accurately grasp the provision timing, and the provided boost value will not exceed the deficient value, so that the torque of the entire vehicle is smooth, unexpected torque will not occur, and the fuel consumption is reduced. Regarding the drivability, maneuverability and ride comfort of the entire vehicle, better performance improvement have been achieved.

BRIEF DESCRIPTION

Some of the embodiments will be described in detail, with reference to the following figures, wherein like designations denote like members, wherein:

FIG. 9 is a chart of a boost interval value of an engine of a certain type of vehicle, which is stored in a storage apparatus of the vehicle for query during determination.

DETAILED DESCRIPTION

Figure 1:
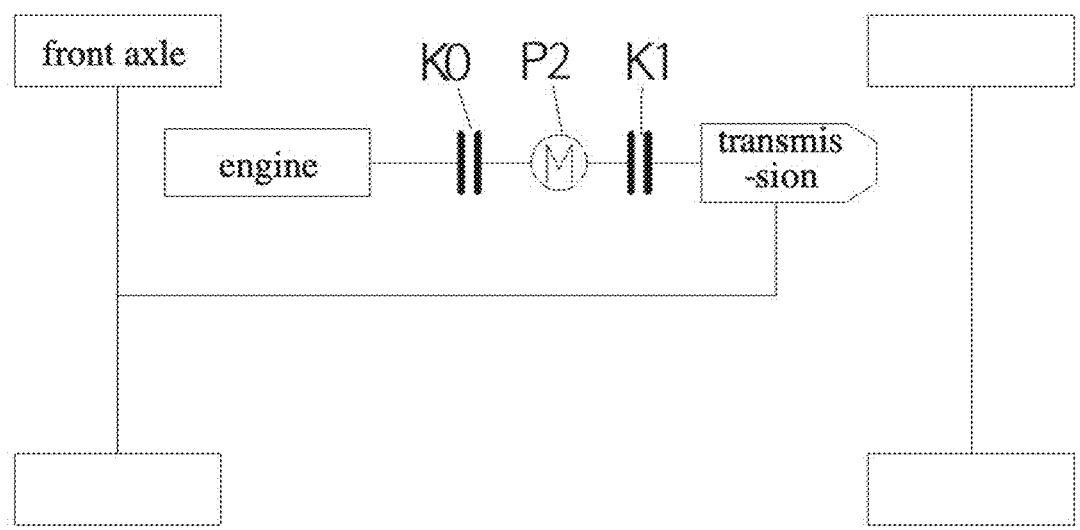
FIG. 1 shows a schematic diagram of electrified components of a hybrid power vehicle having a P2 architecture.

In the following context, only some exemplary embodiments are briefly described. As those skilled in the art would realize, the described embodiments may be modified in various different ways without departing from the spirit or scope of the present disclosure. Accordingly, the accompanying drawings and description are regarded as illustrative in nature and not restrictive.

In the description of the present disclosure, it should be understood that orientation or positional relationships indicated by terms "central", "longitudinal", "traversal", "length", "width", "thickness", "upper", "under", "front", "rear", "left", "right", "vertical", "horizontal", "top", "bottom", "inner", "outer", "clockwise", "counterclockwise" etc. are based on orientation or positional relationships as shown in the drawings, which are only used for the convenience of describing the present disclosure and simplifying the description, rather than indicating or implying that an indicated apparatus or element must have a specific orientation, be constructed and operated in a specific orientation, therefore, the orientation or positional relationships should not be construed as a limitation of the present disclosure. Additionally, terms "first" and "second" are only used for descriptive purposes, and should not be understood as indication or implication of relative importance or implicit indication of the number of an indicated technical feature. Thus, a feature defined with "first" or "second" may expressly or implicitly include one or more of the features. In the description of the present disclosure, "plurality" means two or more, unless expressly and specifically defined otherwise.

In the description of the present disclosure, it should be noted that terms "mounting", "mutual connection" and "connection" should be understood in a broad sense unless otherwise expressly specified and limited. For example, the connection may be a fixed connection or a detachable connection, or an integral connection; the connection may be a mechanical connection or an electrical connection, or may indicate mutual communication; the connection may indicate direct connection or indirect connection through an intermediate medium, or the connection may be internal communication of two elements or interaction between two elements. For those of ordinary skill in the art, the specific meanings of the above terms in the present disclosure may be understood according to specific situations.

In the present disclosure, unless otherwise expressly specified and defined, that a first feature is "on" or "under" a second feature may include direct contact between the first feature and the second feature, or may include that the first feature and the second feature are not directly contacted but are contacted through an additional feature between them. Moreover, that the first feature is "above", "over" and "on" the second feature includes that the first feature is directly above and obliquely above the second feature, or simply means that the first feature has a higher horizontal height than the second feature. That the first feature is "below", "under" and "beneath" the second feature includes that the first feature is directly under and obliquely under the second feature, or simply means that the first feature has a lower horizontal height than the second feature.

The following disclosure provides many different implementations or examples for implementing different structures of the present disclosure. In order to simplify the disclosure of the present disclosure, components and arrangements of specific examples are described below. Of course, the components and arrangements are only examples and are not intended to limit the present disclosure. Furthermore, the present disclosure may repeat reference numerals and/or reference letters in different examples, and this kind of repeat is for the purpose of simplicity and clarity and is not in itself indicative of a relationship between the discussed various implementations and/or arrangements. Additionally, the present disclosure provides examples of various specific processes and materials, but one of ordinary skill in the art should recognize application of other processes and/or use of other materials.

Embodiments of the present disclosure will be described below with reference to the accompanying drawings. It should be understood that the embodiments described herein are only used to illustrate and explain the present disclosure, but not to limit the present disclosure.

The present disclosure provides boost compensation during the "turbo lag". According to the characteristics of the turbocharged engine, the "turbo lag" generally occurs at the moment when the engine starts from a low rotation speed to a full throttle. Before the turbine works, the exhaust gas generated by the engine is required to push the turbine blades to work, and the turbine can be started when the exhaust gas power is large enough, thereby making the torque output by the engine large. During the turbo lag, the vehicle torque does not reach the driver's demand torque. The present disclosure improves the "turbo lag" phenomenon based on the hybrid power vehicle having the P2 architecture, when the engine starts and the exhaust gas is insufficient to drive the turbine to reach a predetermined rotation speed, the P2 motor provides torque compensation boost for the turbine. Therefore, in the present disclosure, the engine and the P2 motor are controlled in real time, and parameters such as the rotation speed, the torque etc., unless otherwise specified, all refer to real-time parameters occurring under an operating condition during the turbo lag.

The so called "compensation" in the present disclosure mainly refers to compensating for this part of torque lacked in the whole vehicle, rather than providing torque compensation for the turbine, or in other words, the present disclosure is aimed to provide torque compensation for the turbocharged engine.

The present disclosure mainly describes calculation of the turbo lag boost torque and determination of timing of boost intervention and exit.

The vehicle involved in the technical solutions proposed in the present disclosure is a hybrid power vehicle having a P2 architecture. FIG. 1 is a schematic diagram of electrified components of a hybrid vehicle having a P2 architecture, as shown in FIG. 1, the vehicle includes a front axle, a turbocharged engine, a transmission, dual clutches K0 and K1, and a P2 motor that are power connected, the dual clutches K0 and K1 are disposed between the turbocharged engine and the transmission, and the P2 motor is disposed between the clutch K0 and an input end of the transmission. The power output from the transmission directly drives the front axle to provide power for the entire vehicle. There is also another kind of hybrid power vehicle having the P2 architecture, which is different from the architecture as shown in FIG. 1 in that the P2 motor is disposed between the K1 and the input end of the transmission, and this architecture is also applicable to the technical concept of the present disclosure. The hybrid power vehicle having the P2 architecture is not provided with a rear axle, and the torque required by the front axle is the torque of the entire vehicle required by the driver.

Figure 2:
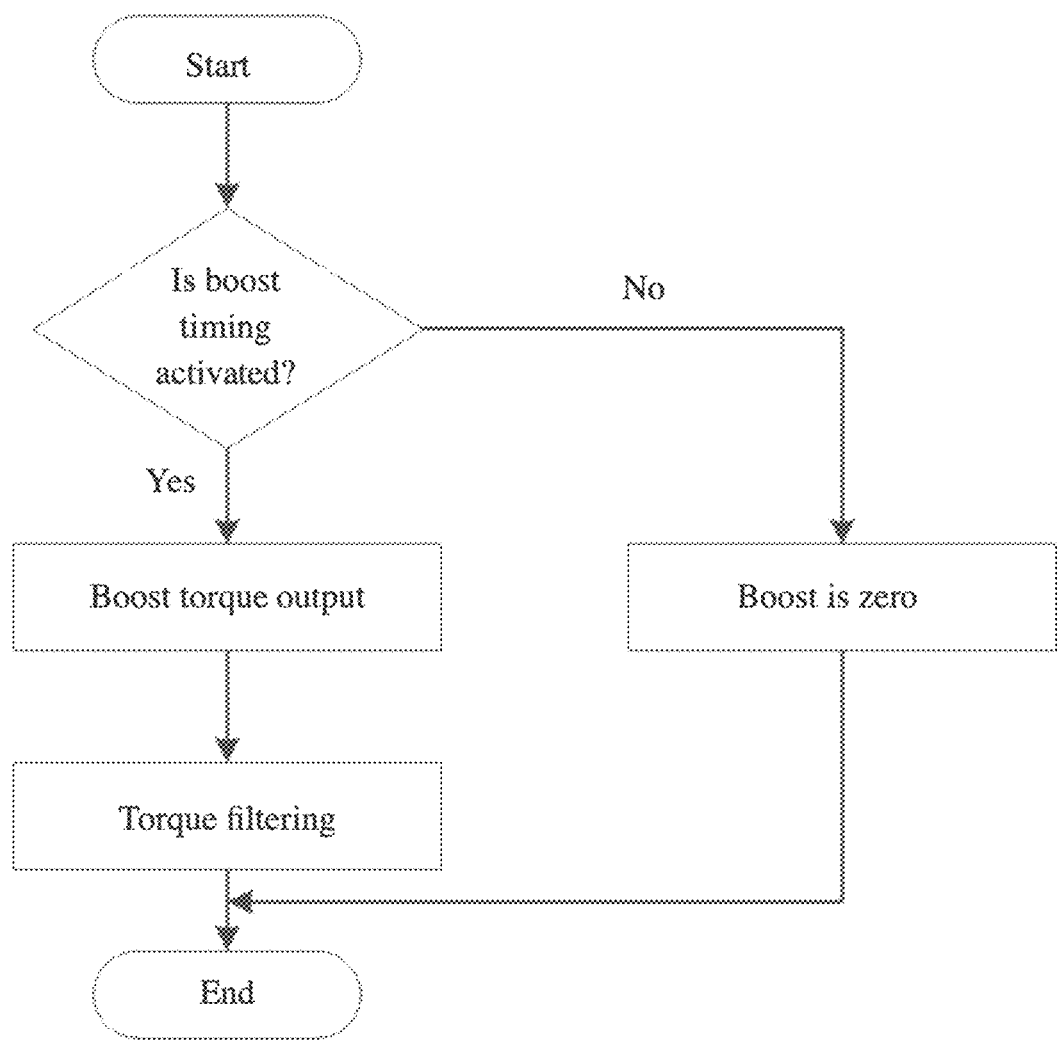
FIG. 2 shows a flowchart of boosting overall operations of the vehicle according to the present disclosure.

The present disclosure proposes a turbo lag boost compensation method based on a hybrid power vehicle having a P2 architecture. FIG. 2 shows a flowchart of the overall vehicle boost operations according to the present disclosure. As shown in FIG. 2, when the vehicle is in turbo lag, it is determined whether timing for turbo lag boost may be activated. When it is determined that the timing meets a requirement and is suitable to provide boost to compensate for the turbo lag, then the torque required for the boost is output. In order to prevent a sudden torque change of the entire vehicle caused by excessive boost torque, the boost torque will be filtered and then output. After the boost compensation is over, the boost will gradually decrease and exit slowly, and the whole process of the turbocharging boost will end. If a result of the determination is that the timing is not suitable to provide boost to compensate for the turbo lag, the boost torque is not output, that is, the boost torque is equal to zero, which indicates that it is not suitable for the P2 to provide boost for the entire vehicle at this moment.

Figure 3:
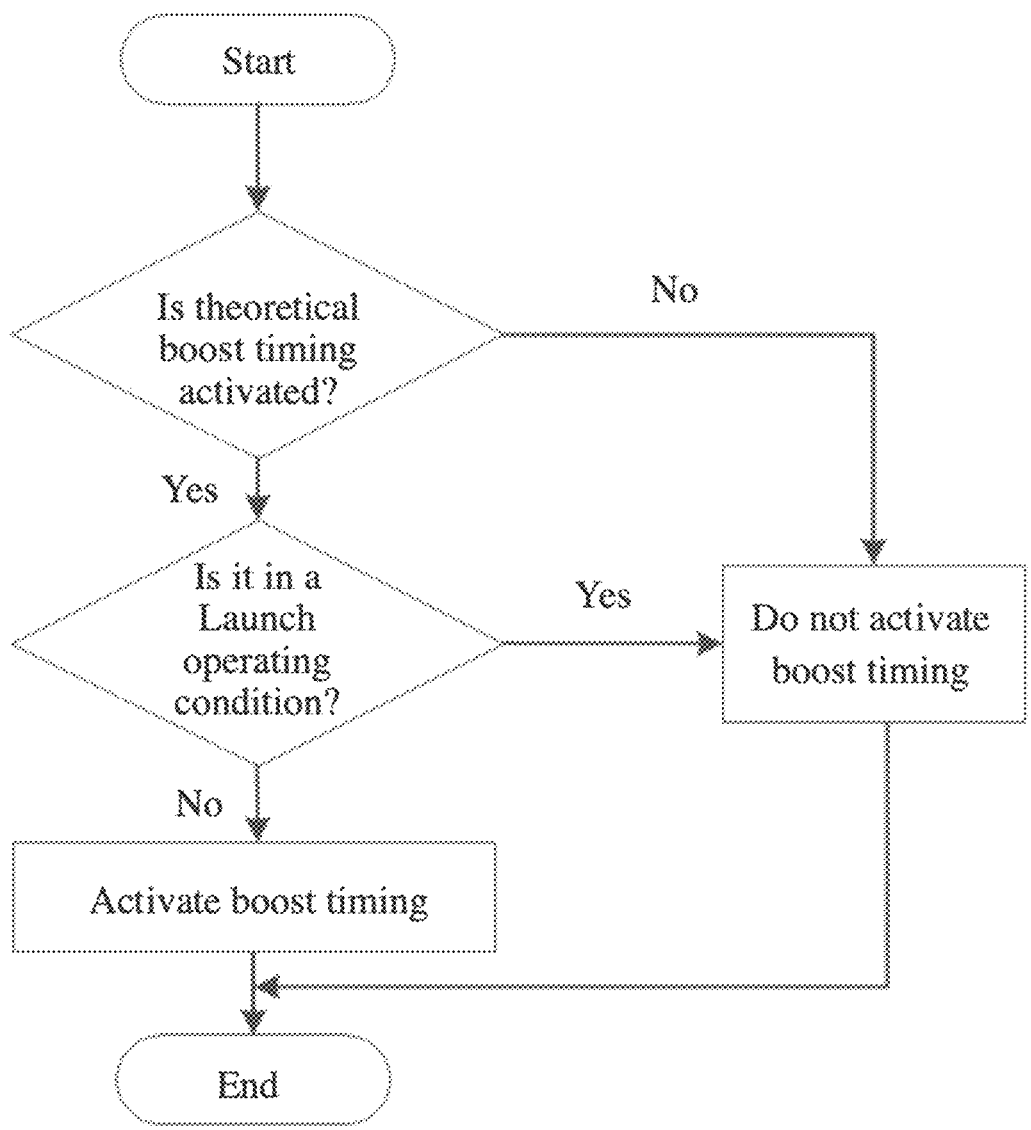
FIG. 3 shows a flowchart of boost timing activation according to an embodiment of the present disclosure.

Whether the timing for the boost is activated or not, the present disclosure considers an engine condition and an entire vehicle condition. FIG. 3 shows a flowchart of boost timing activation according to an embodiment of the present disclosure. As shown in FIG. 3, in this embodiment, the engine condition is first considered to determine whether theoretical boost timing is activated. When a determination result indicates that the theoretical boost timing is not activated, no boost is provided; when the determination result indicates that the theoretical boost timing is activated, a next step is performed to determine the entire vehicle condition. If the determination result indicates that the theoretical boost timing is not activated, the boost timing is not activated, and the output boost is equal to 0. The boost compensation is to improve power performance of the entire vehicle during the turbo lag, and it is necessary to take into account both comfort and maneuverability of the entire vehicle. The entire vehicle determination is also called actual boost timing determination, which mainly depends on whether a condition of the clutch is suitable for receiving the boost. When the entire vehicle is in a Launch operating condition (which is also known as a clutch start operating condition, when the vehicle goes from creeping to starting, the clutch is in a process from slipping to closing, and the slipping process of the clutch requires avoiding excessive rotation speed difference which arises a problem occurred when the clutch is closed, therefore the boost is not suitable in the clutch start operating condition), the boost timing is not activated, and no boost is provided. When the clutch is not in the Launch operating condition, the boost timing is activated and the boost torque is output.

Regardless of the theoretical boost timing or the actual boost timing, the boost torque is output only when both the theoretical boost timing and the actual boost timing are satisfied. As long as one condition is not met, the boost timing cannot be activated, and the output boost torque is equal to zero. Moreover, there is no time distinction between the determination of the theoretical boost timing and the determination of the actual boost timing, and the sequence thereof may be adjusted in other embodiments.

Figure 4:
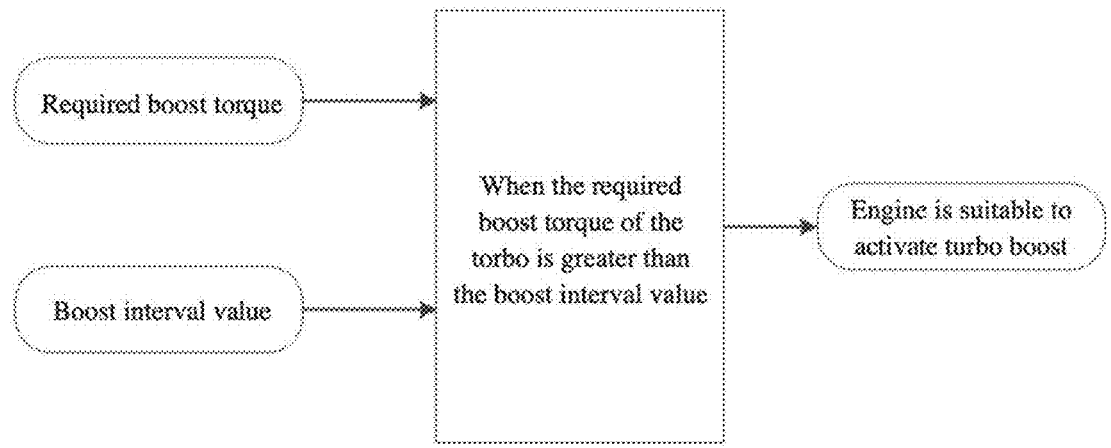
FIG. 4 shows a flowchart of determining theoretical boost timing according to an embodiment of the present disclosure.

The determination of the boost timing takes the needs of the engine itself into account. When the determination result indicates that the provided boost is within a boost interval, which representing that the engine has a boost demand, that is, the boost timing is theoretically satisfied. FIG. 4 shows a flowchart of determining the theoretical boost timing according to an embodiment of the present disclosure. As shown in FIG. 4, determining whether the theoretical boost timing is activated includes:

acquiring a boost interval value of the turbocharged engine under a operating condition;

comparing a required output boost torque Ts' with the boost interval value;

when the required output boost torque Ts'>the boost interval value, activating the theoretical boost timing;

when the required output boost torque Ts'≤the boost interval value, the theoretical assist timing being not activated.

Figure 5:
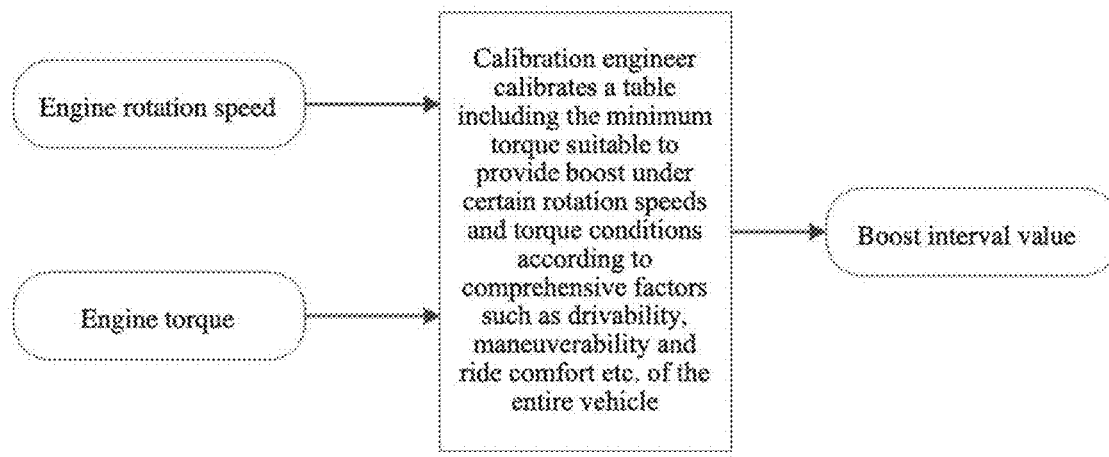
FIG. 5 shows a flowchart of determining a boost interval value according to an embodiment of the present disclosure.

FIG. 5 shows a flowchart of determining a boost interval value according to an embodiment of the present disclosure. As shown in FIG. 5, according to an immediate rotation speed and engine torque of the engine under this operating condition and a boost interval table calibrated by the engine, the boost interval value of the engine at this moment is determined.

Each type of engine corresponds to one boost interval. The boost interval refers to a working interval of the turbocharged engine where the power performance of the engine is poor due to that the turbine fails to intervene during the turbo lag, at this time, it is suitable to provide boost compensation. The boost interval value is the acceptable minimum torque of the boost compensation under this operating condition.

The boost interval value is an acceptable critical value of the boost compensation under a premise of satisfying drivability, maneuverability and ride comfort of the entire vehicle at a certain rotation speed and torque moment of the engine.

When the provided boost torque is less than the boost interval value, the drivability, maneuverability and ride comfort of the entire vehicle will become worse, which indicates that the P2 motor is not suitable to provide boost under this operating condition. On the contrary, when the compensated boost is greater than the calibrated boost interval value, it means that it is suitable for receiving boost compensation within the boost interval.

The boost interval value is calibrated by a calibration engineer according to experimental data before the vehicle leaves a factory. In an experiment, the calibration engineer tests the engine under certain rotation speeds and torque conditions one by one to determine the acceptable minimum boost compensation torque value through considering factors such as drivability, maneuverability and ride comfort etc. of the vehicle.

FIG. 9 is a chart of a boost interval value of an engine of a certain type of vehicle, which is stored in a storage apparatus of the vehicle for query during determination. The values in the table of FIG. 9 are acquired according to actual vehicle calibration tests. The values in the boxed area are the boost interval values.

For example, under a certain operating condition, the engine torque is 75, the rotation speed of the engine is 1300, and the required boost torque Ts' is 300, it can be seen from the table that the boost interval value is 250 which is less than Ts', then it is determined that the turbo boost may be at an activated state, that is, the theoretical boost timing is determined as activated; if the rotation speed of the engine drops to 1000 as the vehicle runs, the boost interval value is 420 which is greater than Ts', then the turbo boost will enter into an inactive state, that is, the theoretical boost timing is determined as activated, the boost will decrease gradually and exit slowly (the unit of the torque is N·m, and the unit of the rotation speed is r/min).

Figure 6:
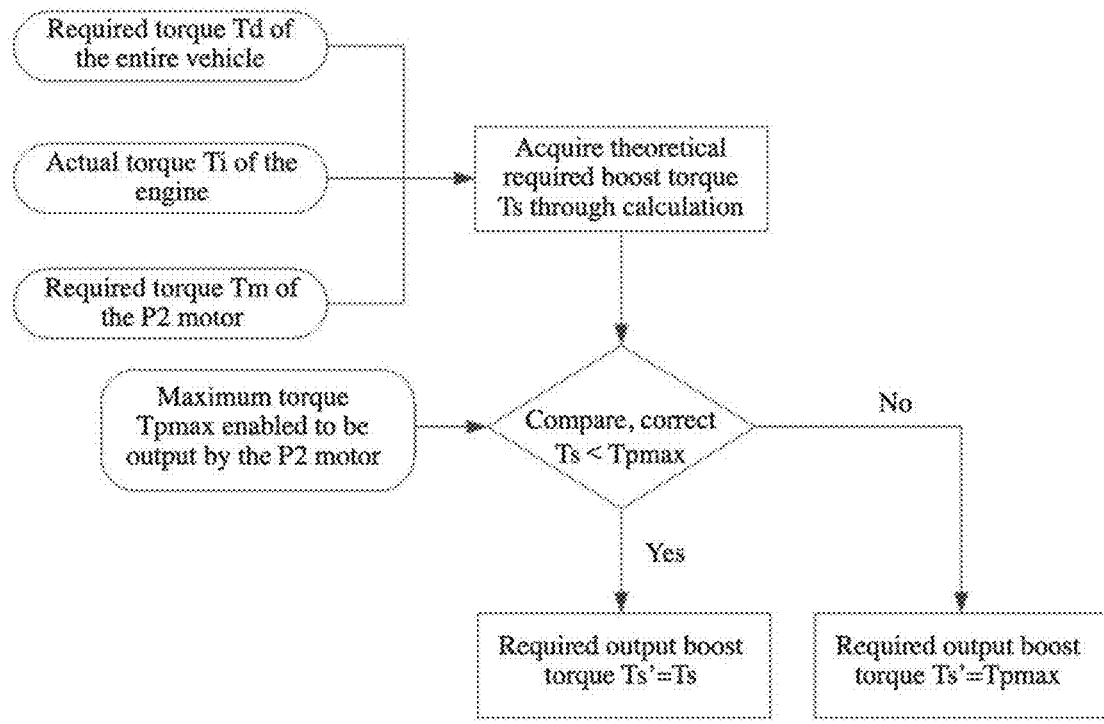
FIG. 6 shows a flowchart of a turbo lag boost compensation calculation method according to an embodiment of the present disclosure.

The above required output boost torque Ts' refers to the boost compensation actually output by the P2 motor and provided to the vehicle. The required output boost torque Ts' of the present disclosure is determined according to parameters under the operating condition. FIG. 6 shows a flowchart of a turbo lag boost compensation calculation method according to an embodiment of the present disclosure, as shown in FIG. 6, the theoretical required boost torque Ts is acquired through calculation according to the required torque Td of the entire vehicle, the actual torque Ti of the engine and the required torque Tm of the P2 motor. The calculation formula is as follows:

$$Ts=Td-(Ti+Tm).$$

The required torque Tm of the P2 motor is usually a negative value under a start operating condition, and is a positive value during a start process. The P2 motor is required to act as a starter motor to drag the engine up, and it is a negative torque only after the start is completed.

The theoretical required boost torque Ts at this moment is acquired, and an initial value of the boost torque is corrected according to a limit value of the motor's own capability. The reason for the correction is that the acquired boost torque provided by the P2 motor only considers the required boost torque of the entire vehicle, and does not consider a capability value of the P2 motor itself, so the final output required turbo boost torque should be equal to the boost torque able to be provided by the P2 motor after correction via the limit value of P2 motor. The correction steps includes:

comparing the acquired theoretical required boost torque Ts with the maximum torque Tpmax enabled to be output by the P2 motor to determine the required output boost torque Ts', and finally outputting the determined required output boost torque Ts' to drive the front axle.

If the Ts exceeds the maximum torque enabled to be output by the P2 motor, then the maximum torque Tpmax enabled to be output by the P2 motor is used as the Ts; if the Ts is less than the maximum torque enabled to be output by the P2 motor, then the Ts is used as the boost torque, namely:

when Ts≥Tpmax, the required output boost torque Ts'=Tpmax, at this time the torque of the entire vehicle is compensated by using the best capacity of the P2 motor, which minimizes the negative impact resulted from the "turbo lag" to the greatest extent;

when Ts<Tpmax, the required output boost torque Ts'=Ts, at this time the P2 motor makes up for the torque lacked from the engine at this stage, which completely eliminates the negative effect resulted from the "turbo lag".

Figure 7:
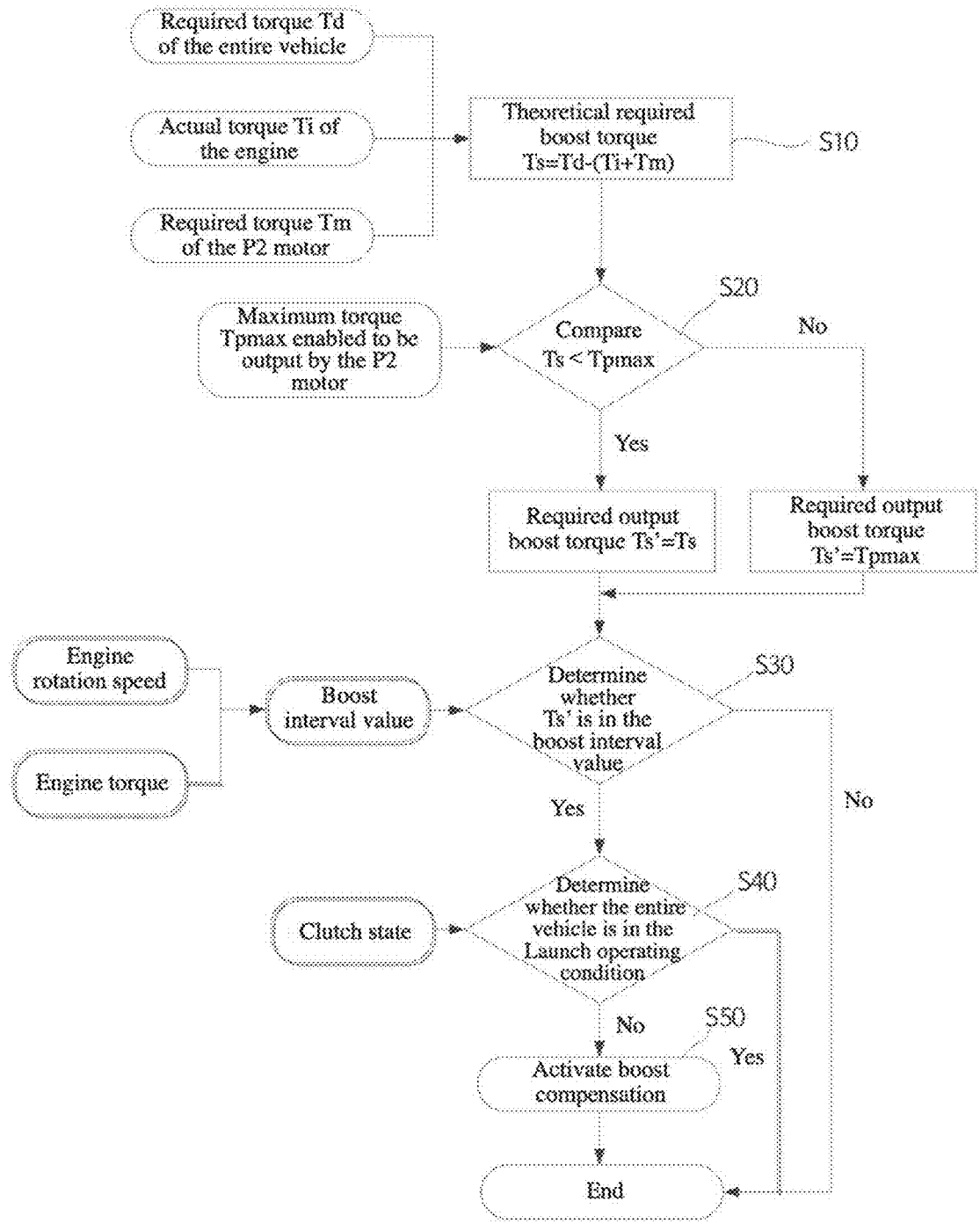
FIG. 7 shows a flowchart of a turbo lag boost compensation method according to an embodiment of the present disclosure.

FIG. 7 shows a flowchart of a turbo lag boost compensation method according to an embodiment of the present disclosure. As shown in FIG. 7, the turbo lag boost compensation method according to an embodiment of the present disclosure includes following steps.

In a step S10: calculate theoretical required boost torque Ts from required torque Td of a front axle, actual torque Ti of a turbocharged engine and required torque Tm of a P2 motor according to the formula Ts=Td-(Ti+Tm).

In a step S20: correct the theoretical required boost torque Ts to acquire required output boost torque Ts', and compare the theoretical required boost torque Ts with maximum torque Tpmax enabled to be output by the P2 motor: when Ts≥Tpmax, the required output boost torque Ts'=Tpmax; when Ts<Tpmax, the required output boost torque Ts'=Ts.

Next, as in a step S30, it is determined whether the required output boost torque Ts' is in a boost interval.

In the step S30, acquire a boost interval value under a operating condition according to a rotation speed and torque of the engine at the moment, and compare the required output boost torque Ts' with the boost interval value to determine whether the engine is in a booster interval at the moment and whether it is suitable for boost compensation.

When the Ts' falls into the boost interval (Ts'>boost interval value), a step S40 is performed; when Ts'≤boost interval value, the boost torque compensation will not be activated and the determination will be ended.

In the Step S40, determine whether an entire vehicle is suitable for boost compensation by considering a condition of the entire vehicle. In this step, a clutch state is mainly considered, and when the entire vehicle is not in a Launch operating condition, a step S50 is performed. When the entire vehicle is in the Launch operating condition and the entire vehicle is not suitable for boost providing, the boost torque compensation will not be activated and the determination will be ended.

In a step S50, activate the boost compensation, and provide boost for the entire vehicle by the P2 motor.

Here, the sequence of the step S30 and the step S40 may be interchanged, or the step S30 and the step S40 may be performed synchronously.

Figure 8:
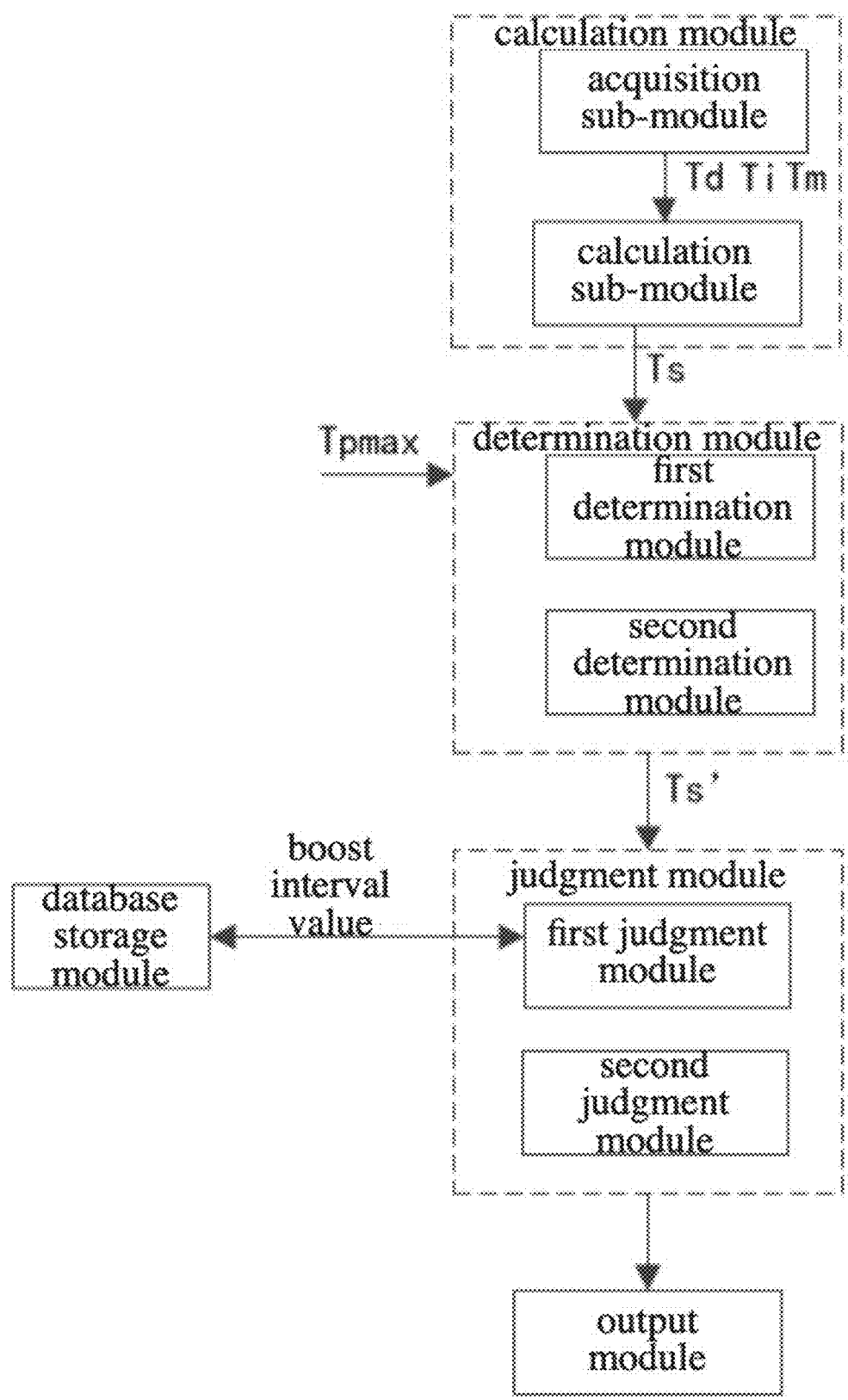
FIG. 8 shows a functional block diagram of a turbo lag boost compensation apparatus according to an embodiment of the present disclosure.

The present disclosure further provides a turbo lag boost compensation apparatus. FIG. 8 shows a functional block diagram of a turbo lag boost compensation apparatus according to an embodiment of the present disclosure. The apparatus as shown in FIG. 8 implements the method as shown in FIG. 7. As shown in FIG. 8, the apparatus includes a calculation module, a determination module, a judgment module and an output module. The calculation module is configured to calculate an initial value Ts of theoretical required boost torque. The determination module is configured to determine required output boost torque Ts' according to a magnitude relationship between the initial value Ts of theoretical required boost torque and maximum torque Tpmax enabled to be output by the P2 motor. The judgment module is configured to determine whether timing for turbo lag boost is activated. When the timing for the turbo lag boost is activated, the required output boost torque Ts' is output by the output module.

Among them, the calculation module includes: an acquisition sub-module and a calculation sub-module. The acquisition sub-module is configured to acquire required torque Td of an entire vehicle, instant actual torque Ti of a turbocharged engine, and required torque Tm of the P2 motor. The calculation sub-module is configured to use a formula Ts=Td−(Ti+Tm) to calculate and acquire the initial value Ts of the theoretical required boost torque, and provide the theoretical required boost torque Ts to the determination module.

The determination module includes a first determination sub-module and a second determination sub-module. The determination module compares the theoretical required boost torque Ts with the maximum torque Tpmax enabled to be output by the P2 motor to perform correction. The first determination sub-module is configured to determine the maximum torque Tpmax enabled to be output by the P2 motor as the required output boost torque Ts' when the initial value Ts of the theoretical required boost torque is greater than or equal to the maximum torque Tpmax enabled to be output by the P2 motor. The second determination sub-module is configured to determine the initial value Ts of the theoretical required boost torque as the required output boost torque Ts' when the initial value Ts of the theoretical required boost torque is less than the maximum torque Tpmax enabled to be output by the P2 motor. The determination module provides the required output boost torque Ts' to the judgment module.

According to a rotation speed and torque of the engine under a operating condition, the judgment module finds a boost interval value in a table stored in a database, compares the boost interval value with the required output boost torque Ts', determines whether to activate timing for theoretical boost, and sends an instruction to activate the timing for the theoretical boost to the second judgment module. The judgment module includes a first judgment sub-module and a second judgment sub-module. The first judgment sub-module is configured to determine whether the timing for the theoretical boost is activated, and the second judgment sub-module is configured to determine whether timing for actual boost is activated, and finally the judgment module sends the judgment activation instruction to the output module. The first judgment sub-module and the second judgment sub-module can work successively, working orders of which are not limited, and the first judgment sub-module and the second judgment sub-module may also work simultaneously.

The present disclosure further provides a turbo lag boost compensation device, the device includes: one or more processors and a storage apparatus. The storage apparatus is used to store one or more programs. When the one or more programs are executed by the one or more processors, the one or more processors implement the above-mentioned turbo lag boost compensation method.

The present disclosure further provides a hybrid power vehicle, as shown in FIG. 1, the vehicle includes power connections: a turbocharged engine, a transmission, clutches between the turbocharged engine and the transmission, a P2 motor disposed between the clutches and the transmission, and the above-mentioned turbo lag boost compensation apparatus or the above-mentioned turbo lag boost compensation device, and the foregoing method is used to provide turbo boost compensation for the entire vehicle.

At every moment after the engine is started, the present disclosure calculates and determines the actual boost torque that needs to be provided according to the required torque of the front axle, the torque actually output by the turbocharged engine and the torque required by the P2 motor at this moment, and then the boost is provided to the turbocharged engine according to the actual instant rotation speed of the turbocharged engine at this moment and the boost interval corresponding to torque until the turbocharged engine is capable of responding to the driver's torque request, the boost provided by the P2 motor will decrease gradiently, exit slowly, and the whole process of the turbocharging boost will be over. In this way, the adverse effects of the turbo lag on the vehicle are eliminated or minimized. The present disclosure effectively solves the adverse effects of the turbo lag on the entire vehicle, such as slow torque response and sudden torque change etc., and improves the drivability and power performance of the entire vehicle.

The present disclosure further provides a computer program product (non-transitory computer readable storage medium having instructions, which when executed by a processor, perform actions), that when executed on a data processing device, the computer program product is adapted to execute a program initialized as any of the method steps described above.

As will be appreciated by those skilled in the art, the embodiments of the present disclosure may be provided as a method, a system, or a computer program product. Accordingly, the present disclosure may take a form of an entire hardware embodiment, an entire software embodiment, or an embodiment combining software and hardware aspects. Furthermore, the present disclosure may take a form of a computer program product implemented on one or more computer-usable storage media (including, but not limited to, disk storage, CD-ROM, optical storage, etc.) containing a computer-usable program code therein.

The present disclosure is described with reference to flowcharts and/or block diagrams of the method, device (system) and computer program product according to the embodiments of the present disclosure. It will be understood that each flow and/or block in the flowcharts and/or block diagrams, and a combination of the flow(s) and/or the block(s) in the flowcharts and/or block diagrams, may be implemented by computer program instructions. These computer program instructions may be provided to a processor of a general purpose computer, special purpose computer, embedded processor or other programmable data processing device to produce a machine, such that the instructions executed by the processor of the computer or other programmable data processing device produce an apparatus for implementing functions specified in one or more flows of the flowcharts and/or one or more blocks of the block diagrams.

These computer program instructions may also be stored in a computer-readable memory capable of directing the computer or other programmable data processing device to function in a particular manner, such that the instructions stored in the computer-readable memory generate a manufacture article including an instruction apparatus, and the instruction apparatus implements the functions specified in one or more flows of the flowcharts and/or one or more blocks of the block diagrams.

These computer program instructions may also be loaded on the computer or other programmable data processing device, such that a series of operational steps are performed on the computer or other programmable device to produce a computer-implemented process, thereby the instructions executed on the computer or other programmable device provide steps for implementing the functions specified in one or more flows of the flowcharts and/or one or more blocks of the block diagrams.

In a typical configuration, the computing device includes one or more processors (CPUs), an input/output interface, a network interface, and a memory.

The memory may include a form such as a non-persistent memory, a RAM (Random Access Memory) and/or a non-volatile memory etc. in a computer-readable medium, for example, a ROM (Read Only Memory) or a flash RAM (flash Random Access Memory). The memory is an example of the computer-readable medium.

The computer-readable medium includes both persistent and non-permanent, removable and non-removable media, and storage of information may be implemented by any method or technology. The information may be a computer-readable instruction, a data structure, a module of a program, or other data. An example of the computer storage medium includes, but is not limited to, a PRAM (Phase-change Random Access Memory), SRAM (Static Random Access Memory), DRAM (Dynamic Random Access Memory), other types of RAM (Random Access Memory), ROM (Read Only Memory), EEPROM (Electrically Erasable Programmable Read Only Memory), flash memory or other memory technology, CD-ROM (Compact Disc Read Only Memory), DVD (Digital Versatile Disc) or other optical storage, magnetic tape cassette, magnetic tape, magnetic disk storage or other magnetic storage device, or any other non-transmission medium that can be used to store information accessible by a computing device. As defined herein, the computer-readable medium does not include transitory computer-readable media, such as modulated data signals and carrier waves.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. A turbo lag boost compensation method implemented by a turbo lag boost compensation device comprising one or more processors, the turbo lag boost compensation method comprising:
    calculating theoretical required boost torque Ts;
    determining required output boost torque Ts' according to a magnitude relationship between the theoretical required boost torque Ts and maximum torque Tpmax enabled to be output by a P2 motor;
    determining whether timing for turbo lag boost is activated;
    outputting the determined required output boost torque Ts' when the timing for the turbo lag boost is activated; and determining boost torque as zero when the timing for the turbo lag boost is not activated;
    determining whether the required output boost torque Ts' is in a boost interval;
    determining, when the required output boost torque Ts' falls within the boost interval, whether the vehicle is in a launch operation condition so as to determine whether it is suitable for activating a boost compensation; and
    activating the boost compensation and providing boost for the vehicle by the P2 motor, when the vehicle is not in the Launch operation condition;
    wherein the theoretical required boost torque Ts is calculated according to Ts=Td−(Ti+Tm); wherein:
    Td is instant required torque of an entire vehicle,
    Ti is instant actual torque of a turbocharged engine,
    Tm is instant required torque of the P2 motor.

2. The method according to claim 1, wherein said determining required output boost torque Ts' according to a magnitude relationship between the theoretical required boost torque Ts and maximum torque Tpmax enabled to be output by a P2 motor comprises:
    when Ts≥Tpmax, determining the required output boost torque Ts' as Ts'=Tpmax;
    when Ts<Tpmax, determining the required output boost torque Ts' as Ts'=Ts.

3. A turbo lag boost compensation device, comprising:
one or more processors;
a storage apparatus configured to store one or more programs;
    wherein the one or more programs, when executed by the one or more processors, cause the one or more processors to implement steps of:
    calculating theoretical required boost torque Ts;
    determining required output boost torque Ts' according to a magnitude relationship between the theoretical required boost torque Ts and maximum torque Tpmax enabled to be output by a P2 motor;
    determining whether timing for turbo lag boost is activated;
    outputting the determined required output boost torque Ts' when the timing for the turbo lag boost is activated; and determining boost torque as zero when the timing for the turbo lag boost is not activated;
    determining whether the required output boost torque Ts' is in a boost interval;
    determining, when the required output boost torque Ts' falls within the boost interval, whether the vehicle is in a launch operation condition so as to determine whether it is suitable for activating a boost compensation; and
    activating the boost compensation and providing boost for the vehicle by the P2 motor, when the vehicle is not in the Launch operation condition;
    wherein the theoretical required boost torque Ts is calculated according to Ts=Td−(Ti+Tm);
    wherein:
    Td is instant required torque of an entire vehicle,
    Ti is instant actual torque of a turbocharged engine,
    Tm is instant required torque of the P2 motor.

4. The method according to claim 1, wherein the timing for the turbo lag boost comprises a theoretical boost timing and an actual boost timing, and said determining whether timing for turbo lag boost is activated comprises:
    determining whether both the theoretical boost timing and the actual boost timing are activated.

5. The method according to claim 4, wherein said determining whether the actual boost timing is activated comprises:
    determining whether an entire vehicle is in a clutch start operating condition, determining not to activate the actual boost timing when it is determined that the entire vehicle is in the clutch start operating condition, and determining to activate the actual boost timing when it is determined that the entire vehicle is not in the clutch start operating condition.

6. The method according to claim 4, wherein said determining whether the theoretical boost timing is activated comprises:
    determining a boost interval value of a turbocharged engine under a current operating condition;
    comparing the required output boost torque Ts' with the boost interval value;

determining to activate the theoretical boost timing when the required output boost torque Ts'>the boost interval value;

determining not to activate the theoretical boost timing when the required output boost torque Ts'≤the boost interval value.

7. The method according to claim 6, wherein said determining a boost interval value of a turbocharged engine under a current operating condition comprises:

according to an engine rotation speed and engine torque of the turbocharged engine under the current operating condition, looking for the corresponding boost interval value from a pre-calibrated table comprising a corresponding relationship between different engine rotation speeds, engine torque and boost interval values.

8. The method according to claim 1, wherein before outputting the required output boost torque Ts', the method further comprises performing filtering on the required output boost torque Ts'.

9. A turbo lag boost compensation apparatus, comprising:

a calculation module configured to calculate theoretical required boost torque Ts;

a determination module configured to determine required output boost torque Ts' according to a magnitude relationship between the theoretical required boost torque Ts and maximum torque Tpmax enabled to be output by a P2 motor;

a judgment module configured to determine whether timing for turbo lag boost is activated;

an output module configured to output the determined required output boost torque Ts' when the timing for the turbo lag boost is activated;

wherein the judgement module is further configured to:
determine whether the required output boost torque Ts' is in a boost interval;
determine, when the required output boost torque Ts' falls within the boost interval, whether the vehicle is in a launch operation condition so as to determine whether it is suitable for activating a boost compensation; and
activate the boost compensation and providing boost for the vehicle by the P2 motor, when the vehicle is not in the Launch operation condition;

wherein the calculation module comprises:
an acquisition sub-module configured to acquire required torque Td of an entire vehicle, instant actual torque Ti of a turbocharged engine, and required torque Tm of the P2 motor;
a calculation sub-module configured to calculate and acquire the theoretical required boost torque Ts by adopting a formula Ts=Td−(Ti+Tm).

10. The apparatus according to claim 9, wherein the timing for the turbo lag boost comprises a theoretical boost timing and an actual boost timing, and the judgment module comprises:

a first judgment sub-module configured to: determine whether the required output boost torque Ts' is greater than a pre-configured boost interval value, and determine to activate the theoretical boost timing when the required output boost torque Ts' is greater than a pre-configured boost interval value;

a second judgment sub-module configured to determine whether an entire vehicle is in a clutch start operating condition, and determine to activate the actual boost timing when the entire vehicle is not in the clutch start operating condition;

wherein the timing for the turbo lag boost is activated when both the theoretical boost timing and the actual boost timing are activated.

11. The apparatus according to claim 10, wherein the boost interval value is pre-configured based on an engine rotation speed and engine torque of a turbocharged engine under different operating conditions.

12. The device according to claim 3, wherein the timing for the turbo lag boost comprises a theoretical boost timing and an actual boost timing, and said determining whether timing for turbo lag boost is activated comprises:

determining whether both the theoretical boost timing and the actual boost timing are activated.

13. The apparatus according to claim 9, wherein the determination module comprises:

a first determination sub-module configured to determine the maximum torque Tpmax enabled to be output by the P2 motor as the required output boost torque Ts' when the theoretical required boost torque Ts is greater than or equal to the maximum torque Tpmax enabled to be output by the P2 motor;

a second determination sub-module configured to determine the theoretical required boost torque Ts as the required output boost torque Ts' when the theoretical required boost torque Ts is less than the maximum torque Tpmax enabled to be output by the P2 motor.

14. The device according to claim 12, wherein said determining whether the actual boost timing is activated comprises:

determining whether an entire vehicle is in a clutch start operating condition, determining not to activate the actual boost timing when it is determined that the entire vehicle is in the clutch start operating condition, and determining to activate the actual boost timing when it is determined that the entire vehicle is not in the clutch start operating condition.

15. The device according to claim 12, wherein said determining whether the theoretical boost timing is activated comprises:

determining a boost interval value of a turbocharged engine under a current operating condition;
comparing the required output boost torque Ts' with the boost interval value;
determining to activate the theoretical boost timing when the required output boost torque Ts'>the boost interval value;
determining not to activate the theoretical boost timing when the required output boost torque Ts'≤the boost interval value.

16. The device according to claim 15, wherein said determining a boost interval value of a turbocharged engine under a current operating condition comprises:

according to an engine rotation speed and engine torque of the turbocharged engine under the current operating condition, looking for the corresponding boost interval value from a pre-calibrated table comprising a corresponding relationship between different engine rotation speeds, engine torque and boost interval values.

17. The device according to claim 3, wherein said determining required output boost torque Ts' according to a magnitude relationship between the theoretical required boost torque Ts and maximum torque Tpmax enabled to be output by a P2 motor comprises:

when Ts≥Tpmax, determining the required output boost torque Ts' as Ts'=Tpmax;

when Ts<Tpmax, determining the required output boost torque Ts' as Ts'=Ts.

\* \* \* \* \*